(12) United States Patent
Rao

(10) Patent No.: US 8,014,833 B2
(45) Date of Patent: Sep. 6, 2011

(54) AUTOMATIC LOCATION-BASED RESOURCE MANAGEMENT FOR NETWORK DEVICES

(75) Inventor: Anand Narayanan Rao, Chennai (IN)

(73) Assignee: Cisco Technology, Inc., San Jose, CA (US)

(*) Notice: Subject to any disclaimer, the term of this patent is extended or adjusted under 35 U.S.C. 154(b) by 920 days.

(21) Appl. No.: 11/477,295

(22) Filed: Jun. 28, 2006

(65) Prior Publication Data
US 2007/0249316 A1    Oct. 25, 2007

(30) Foreign Application Priority Data
Apr. 24, 2006   (IN) .......................... 1034/DEL/2006

(51) Int. Cl.
*H04M 1/00*   (2006.01)
*H04B 1/38*   (2006.01)

(52) U.S. Cl. .............. 455/574; 455/456.1; 455/456.3; 455/552.1; 455/553.1; 455/556.1; 455/41.2; 455/90.1; 455/90.2; 455/343.1; 455/343.2; 455/343.3

(58) Field of Classification Search ............ 455/574, 455/90.1–90.2, 552.1, 553.1, 41.2, 550.1, 455/74, 74.1, 456.1, 456.3, 456.4, 456.6, 455/556.1–556.2, 343.1–343.5
See application file for complete search history.

(56) References Cited

U.S. PATENT DOCUMENTS

| 6,496,111 | B1 * | 12/2002 | Hosack ...................... 340/540 |
| 6,725,138 | B2 * | 4/2004 | DeLuca et al. ................ 701/36 |
| 6,807,484 | B2 * | 10/2004 | Inoue et al. .................. 701/213 |
| 6,970,714 | B2 | 11/2005 | D'Souza et al. |
| 7,308,272 | B1 * | 12/2007 | Wortham .................. 455/456.1 |
| 2005/0124339 | A1 | 6/2005 | Lau |

FOREIGN PATENT DOCUMENTS
JP   2002-290308   * 10/2002
* cited by examiner

*Primary Examiner* — Tuan A Tran
(74) *Attorney, Agent, or Firm* — Fish & Richardson P.C.

(57) ABSTRACT

A system and method for automatically managing resource usage of a network device based on device location. In an illustrative embodiment, the system includes a first module that is coupled to a network device. The first module provides position information associated with the network device. A controller communicates with the first module; receives the position information; and generates a control signal in response thereto based on predetermined network information. A second module that is coupled to the network device incorporates instructions to adjust the resource usage of the network device upon receipt of the control signal. In a more specific embodiment, the first module includes a Global Positioning System (GPS) receiver. The predetermined network information includes network coverage area. The resource usage includes power usage. The second module includes instructions for turning off a receiver, which is coupled to the first module, based on the control signal.

24 Claims, 4 Drawing Sheets

AUTOMATIC LOCATION-BASED RESOURCE MANAGEMENT FOR NETWORK DEVICES

BACKGROUND OF THE INVENTION

This invention is related in general to networks and more specifically to systems and methods for selectively controlling network resource usage.

For the purposes of the present discussion, a network resource may be any network entity or characteristic or associated identifier. Examples of network entities include computers, switches, interfaces, software, batteries, and so on. Examples of characteristics or identifiers include communications link bandwidth, power consumption, router processor speed, network services, and so on.

Systems for controlling network resource usage are employed in various demanding applications including wireless network handoff, 802.11 network-coverage-area transitioning, server-load balancers, and so on. Such applications often demand efficient resource-control systems that can minimize unnecessary power consumption and other resource usage.

Systems for efficiently controlling network resources are particularly important in wireless network applications, such as 802.11 networks and cellular networks, where resource usage may rapidly change as different mobile devices connect to the networks or as the networks themselves move. In such applications, wireless routers are often employed to create local mobile hotspots by which nearby users can connect, forming a local network. If the wireless router is within the coverage area of another network, such as a nearby Wide Area Network (WAN), the wireless router may facilitate connecting the local network to the WAN. If the wireless router moves beyond the coverage area of the WAN, communications between the wireless router and the WAN terminate. Hence, wireless networks are susceptible to various topology changes as a wireless routers and devices communicating with the wireless routers change or move. Unfortunately, wireless networks often lack efficient mechanisms to control network resource usage as network topology changes.

DETAILED DESCRIPTION OF EMBODIMENTS OF THE INVENTION

A preferred embodiment of the present invention implements a system and method for automatically managing resource usage of a network device based on device location. The system includes a first module that is coupled to a network device. The first module selectively provides position information associated with the network device. A controller is adapted to receive the position information and to generate a control signal in response thereto based on predetermined network information. A second module, which is coupled to the network device, incorporates instructions to adjust the resource usage of the network device upon receipt of the control signal. In a more specific embodiment, the first module includes a Global Positioning System (GPS) receiver; the predetermined network information includes network coverage area; the resource usage includes power usage; and the second module includes instructions for turning off a receiver based on the control signal.

For clarity, various well-known components, such as, firewalls, Internet Service Providers (ISPs), Application Programming Interfaces (APIs), and so on, have been omitted from the figures. However, those skilled in the art with access to the present teachings will know which components to implement and how to implement them to meet the needs of a given application.

Figure 1:
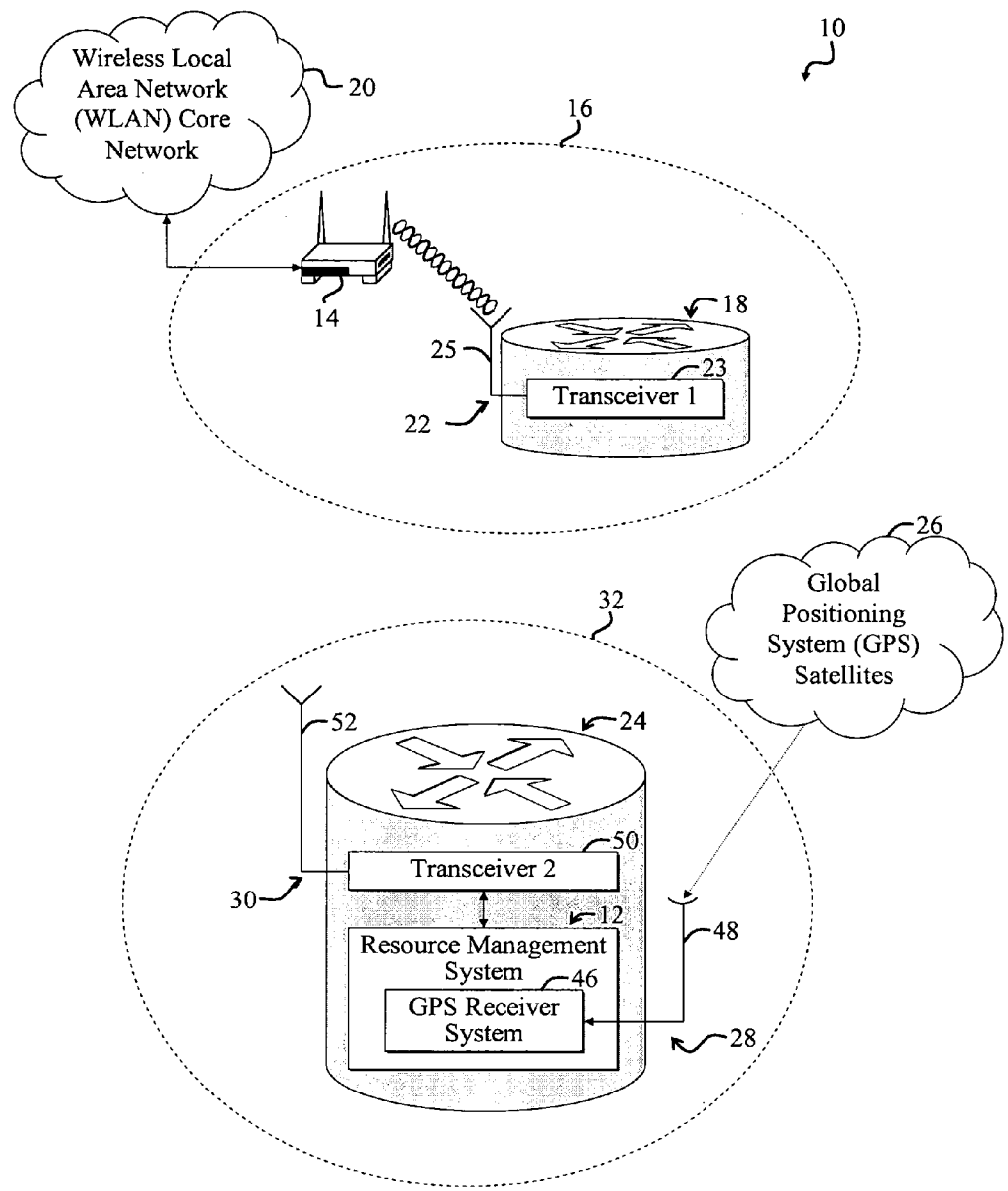
FIG. 1 is a diagram illustrating an exemplary wireless network employing a location-based resource-management system according to an embodiment of the present invention.

FIG. 1 is a diagram illustrating exemplary wireless network 10 employing location-based resource-management system 12 according to an embodiment of the present invention. Exemplary wireless network 10 includes wireless Institute of Electrical and Electronics Engineers (IEEE) 802.11 (Wi-Fi) Access Point (AP) 14, which is associated with wireless coverage area 16 within which a wireless network device may communicate with other wireless network devices, such as first wireless Mobile Access Router (MAR) 18. First wireless MAR 18 is operating within coverage area 16 of wireless AP 14 and communicates with wireless access point 14 via first transceiver system 22, which includes first transceiver module 23 and first transceiver antenna 25. Wireless AP 14 is further connected to Wireless Local Area Network (WLAN) 20. Wireless AP 14 may be implemented via a wireless router without departing from the scope of the present invention.

For illustrative purposes, enhanced MAR 24, which includes the location-based resource-management system 12, is located outside the coverage area 16 of wireless AP 14. Location-based resource-management system 12 of enhanced MAR 24 receives GPS information from GPS satellites 26 via GPS receiver system 28. Enhanced MAR 24 selectively employs a second transceiver system 30 to communicate with network APs, such as access point 14. When MARs 18, 24 are operating in WorkGroup Bridge (WGB) mode, MARs 18, 24 may act as access points. For example, when first MAR 18 is operating in WBG mode, first MAR 18 may exhibit MAR coverage area. For clarity, the MAR coverage area of first MAR 18 coincides with coverage area 16 of wireless AP 14.

Enhanced MAR 24 exhibits transmission range 32, which corresponds to the coverage area of enhanced MAR 24, when enhanced MAR 24 is operating in WGB mode.

In operation, location-based resource-management system 12 implements routines for selectively adjusting resource usage of enhanced MAR 24 based on location information received from GPS receiver system 28, predetermined knowledge of the coverage area of surrounding APs, such as wireless AP 14, and predetermined knowledge of transmission range 32 of MAR 24. For example, when location-based resource-management system 12 determines that enhanced MAR 24 is outside of coverage area 16 of wireless AP 14 and first MAR 18, location-based resource-management system 12 issues resource-management control signals. The resource-management control signals are effective to turn off second transceiver system 30 and to terminate or deactivate any services and/or related applications running on or employed by enhanced MAR 24 that require enhanced MAR 24 to be within coverage area 16 of wireless AP 14 and/or first MAR 18.

Conventionally, when a MAR extends beyond a coverage area of another AP, such as wireless AP 14, or beyond the coverage of a MAR operating on WGB mode, such as first MAR 18, the MAR continues to employ resources, such as transceiver resources, to scan for other APs or MARs operating in WGB mode. This results in excess power consumption, which is particularly problematic for mobile devices, which often rely on batteries with limited power-sourcing capabilities.

Accordingly, use of the present embodiment to selectively turn off or otherwise optimally control device resources, such as transceiver power employed by enhanced MAR 24, may result in reduced power consumption, extended battery life, and so on.

While the present embodiment is discussed with respect to an exemplary network topology, the present invention is not limited thereto. For example, WLAN 20 may be replaced with another network, such as the Internet, without departing from the scope of the present invention. Furthermore, more or fewer APs may be employed, and wireless 802.11 AP 14 may be replaced with an IEEE 802.16 (Wi-MAX) AP, cellular base station, or other type of network AP without departing from the scope of the present invention.

Figure 2:
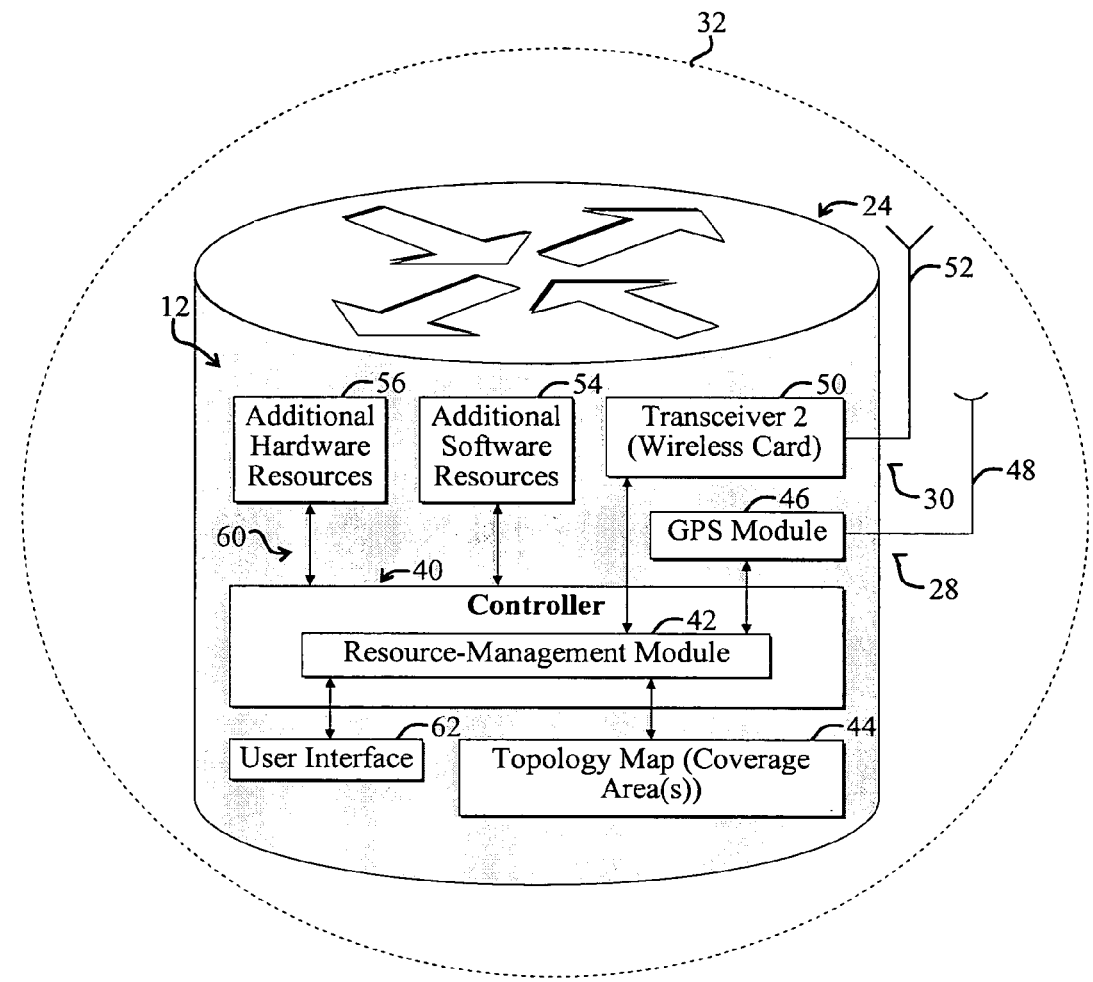
FIG. 2 is a more detailed diagram illustrating an exemplary Mobile Access Radio (MAR) employing the location-based resource-management system of FIG. 1.

FIG. 2 is a more detailed diagram illustrating Mobile Access Router (MAR) 24 of FIG. 1 and accompanying location-based resource-management system 12. Location-based resource-management system 12 includes controller 40 on which runs resource-management module 42. Resource-management module 42 communicates with coverage-area map module 44, GPS module 46 and GPS antenna 48 of GPS-receiver system 28, an IEE 802.11 wireless card 50 and accompanying 802.11 wireless antenna 52 of transceiver system 30, software resources 54, other hardware resources 56. wireless card 50 may be implemented via a Cisco 802.11 g Wireless Mobile Interface Card (WMIC).

In operation, resource-management module 42 periodically receives position information from GPS module 46 pertaining to location of MAR 24. Exact time-intervals at which resource-management module 42 receives position updates from GPS module 46 are application-specific and may adjusted to meet the needs of a given application without departing from the scope of the present invention.

Resource-management module 42, which may be implemented in hardware and/or software, compares the latest MAR-position information received from GPS module 46 with network information, such as topology information. With reference to FIGS. 1 and 2, in the present embodiment, the topology information includes data pertaining to coverage area 16 of wireless AP 14. The topology information is maintained in topology map module 44.

Based on the comparison and based on knowledge of the range of wireless card 50 and or other information, resource-management module 42 determines when enhanced MAR 24 passes outside coverage area 16. When MAR 24 passes outside coverage area 16, use of certain device resources is no longer needed. The device resources are then turned off, deactivated, or otherwise adjusted based on the position of enhanced MAR 24.

The device resources may include wireless card 50, other hardware resources 56, and software resources 54. Examples of software resources include service modules and applications requiring communication with wireless AP 14 of FIG. 1. Examples of other hardware resources include connected computers, external hard drives, and/or other devices that a user determines should be selectively disabled based on the location of enhanced MAR 24.

A user may employ user interface 62 to configure rules employed by resource-management module 42 to adjust resources based on the position of enhanced MAR 24. For example, a user may decide to cause wireless card 50 to periodically power-on at predetermined time intervals when outside the coverage area of wireless AP 14. For example, a user may decide that resource-management module 42 should power-on wireless card 50 every ten minutes to check for other MARs operating in WGB mode and acting as APs that are within transmit range 32 of enhanced MAR 24. Alternatively, a user may configure resource-management module 42 to power-off and/or disable all resources that require communication with wireless AP 14 until enhanced MAR 24 is within coverage area 16. Similarly, a user may configure resource-management module 42 to power-on and/or enable all resources that require communication with wireless AP 14 when enhanced MAR 24 is within coverage area 16 of wireless AP 14.

Those skilled in the art with access to the present teachings may readily develop modules, such as resource-management module 42, required to meet the needs of a given implementation of the present invention.

Figure 3:
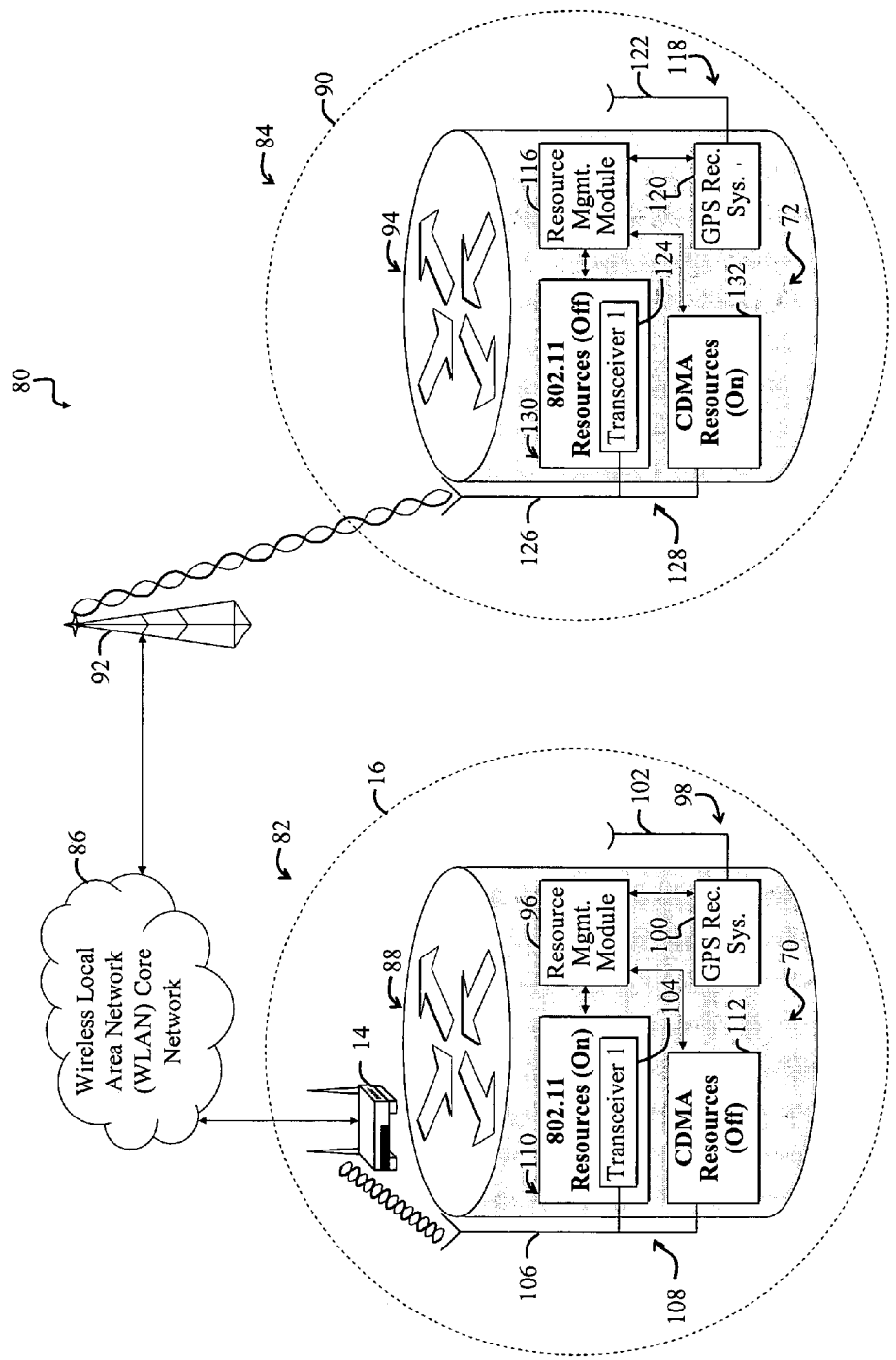
FIG. 3 is a diagram illustrating a location-based resource-management systems according to an embodiment of the present invention deployed in a hybrid cellular and Wireless Fidelity (Wi-Fi) network.

FIG. 3 is a diagram illustrating location-based resource-management systems 70, 72 according to an embodiment of the present invention deployed in hybrid cellular and 802.11 network 80. Hybrid network 80 includes an 802.11 network 82 in communication with Code Division Multiple Access (CDMA) network 84 via core network 86. In the present embodiment, the 802.11 network 82 employs wireless AP 14 with associated coverage area 16. Wireless AP 14 communicates with core network 86 and with first enhanced MAR 88.

CDMA network 84 includes CDMA base station 92 that is associated with cellular coverage area 90. CDMA network 84 includes second enhanced MAR 94 in wireless communication with CDMA base station 92. CDMA base station 92 communicates with core network 86, which may include the Internet, Public Switched Telephone Network (PSTN), or other networks. CDMA network 84 may be implemented via another type of network, such as a Time Division Multiple Access (TDMA), Analog Mobile Phone System, and/or a Global System for Mobility Management (GSM) system, without departing from the scope of the present invention. Furthermore, 802.11 network 82 may be implemented via another type of network, such as a Wi-MAX network.

First enhanced MAR 88 employs first resource-management module 96 included in first resource-management system 70. First resource-management module 96 communicates with first GPS receiver system 98, which includes first GPS receiver module 100 and accompanying GPS antenna 102. First resource-management module 96 further communicates with first 802.11 transceiver system 108, which includes first 802.11 transceiver module 104 with an accompanying 802.11 antenna 106. First resource-management module 96 implements one or more routines in software and/or hardware for selectively adjusting first set of 802.11 resources 110 and first set of CDMA resources 112 based on the location of first enhanced MAR 88 relative to coverage area 16 of wireless AP 14 and CDMA coverage area 90.

Similarly, second enhanced MAR 94 employs second resource-management module 116 included in second resource-management system 72. Second resource-management module 116 communicates with second GPS receiver system 118, which includes second GPS receiver module 120 and accompanying GPS antenna 122. Second resource-management module 116 further communicates with a CDMA transceiver system 128, which includes a CDMA transceiver module 124 with an accompanying CDMA antenna 126.

Second resource-management module 116 implements one or more routines in software and/or hardware for selectively adjusting a second set of 802.11 resources 130 and a second set of CDMA resources 132 based on the location of second enhanced MAR 94 relative to coverage area 16 of wireless AP 14 and CDMA coverage area 90.

In operation, first enhanced MAR 88 is operating with 802.11 coverage area 16 and outside of CDMA coverage area 90. Consequently, according to the present specific embodiment, first resource-management module 96 disables and/or turns off first set of CDMA resources 112 and enables and/or turns on first set of 802.11 resources 110, which may include 802.11 transceiver system 108. Similarly, if first enhanced MAR 88 travels outside of 802.11 coverage area 16 and within CDMA coverage area 90, first enhanced MAR 94 will then turn off first set of 802.11 resources 110 and turn on first set of CDMA resources 112.

Accordingly, second enhanced MAR 94, which operates within CDMA coverage area 90 and outside of 802.11 coverage area 16, employs second resource-management module 116 to disable second set of 802.11 resources 130 and to enable second set of CDMA resources 132.

For the purposes of the present discussion, 802.11 resources may be any resources, such as services, transmitters, and applications, that are employed to communicate with or depend on communication with an 802.11 AP, such as wireless AP 14. Similarly, CDMA resources may be any resources that are employed to communicate with or depend on communication with a CDMA base station, mobile switching center, or other CDMA network component, such as CDMA base station 92.

While the present embodiment is discussed with respect to use of MARs, other types of network devices may be employed without departing from the scope of the present invention. For example, the MARs may be replaced with cellular telephones that are Wi-Fi capable without departing from the scope of the present invention.

Figure 4:
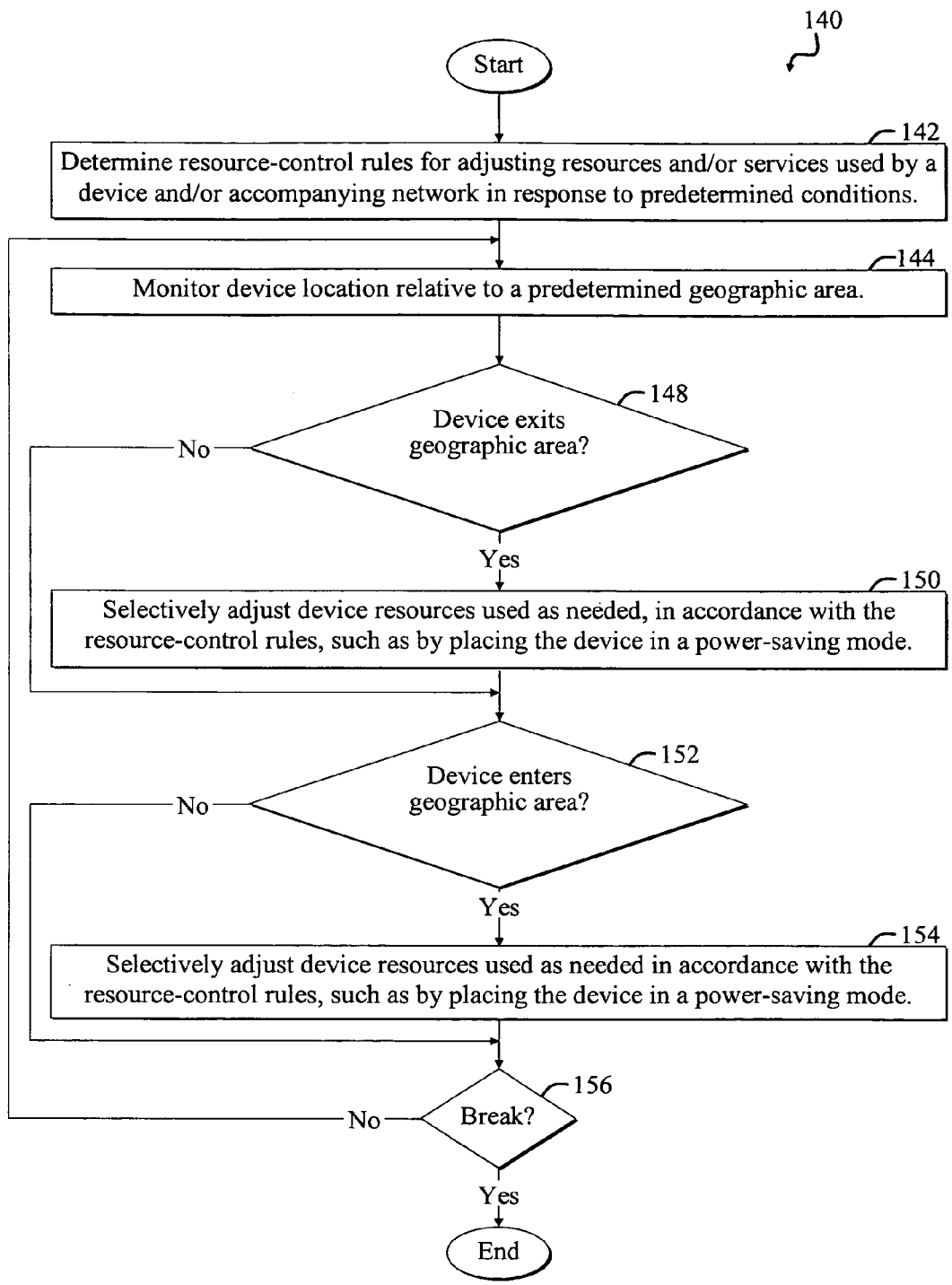
FIG. 4 is a flow diagram of a method that is adapted for use with the location-based resource-management systems of FIGS. 1-3.

FIG. 4 is a flow diagram of method 140 that is adapted for use with location-based resource-management systems 12, 70, 72 of FIGS. 1-3. Method 140 may be employed to implement automatic location-based management or resources for mobile computing devices and associated networks.

Method 140 includes an initial rule-determining step 142, which involves determining resource-control rules for adjusting resources and/or related services used by a device and/or accompanying network in response to predetermined conditions. The device may be implemented via any type of network-computing device that employs resources that are useful in one geographic area and are not useful or are less useful in another geographic area. For example, the network device may be a Cisco c3200 series MAR with an IEEE 802.11 g Wireless Mobile Interface Card (WMIC); a cellular phone; and so on. The network may any type of network that exhibits a coverage area within which certain resources may be used by a device that is connected to the network. Examples of suitable networks include IEEE 802.11 networks; cellular CDMA networks, and so on. Examples of resources that may be selectively controlled include power consumption, router zeroization software for clearing router cache, Network Address Translation (NAT) software, and so on.

Subsequently, monitoring step 144 is performed, wherein the location of the network device relative to a predetermined geographic area, such as the coverage area of a network AP, is monitored. If the device exits or is currently outside the predetermined geographic area as determined in subsequent exit-checking step 148, then first resource-adjustment step 150 is performed as needed.

First resource-adjustment step 150 includes selectively adjusting device resources and/or services used in accordance with the resource-control rules. The resources and/or services used may be adjusted by powering-off a transceiver of the device or other hardware and/or software resources or otherwise placing the device in a power-saving mode.

If exit-checking step 148 determines that the network device has not exited or is otherwise within the predetermined graphic area, then subsequent enter-checking step 152 is performed.

If the network device has entered or is within the predetermined geographic area as determined by enter-checking step 152, then second resource-adjustment step 154 is performed.

Second resource-adjustment step 154 involves selectively adjusting device resources and/or services used as needed in accordance with the resource-control rules. The adjusting may include powering-off a transceiver of the device or other hardware and/or software resources.

If the network device has not entered a geographic area as determined in enter-checking step 152, then break-checking step 156 is performed. Break-checking step 156 is also performed upon completion of second resource-adjustment step 152.

Break-checking step 156 determines if a system break has occurred. A system break may occur when the associated network device is turned off and/or when software and/or related hardware for implementing method 140 is turned off or otherwise deactivated. If a system break has occurred, method 140 completes. Otherwise, monitoring step 144 continues.

Various steps 142-156 of method 140 may be omitted, changed, or reordered without departing from the scope of the present invention. For example, method 140 may be replaced with a more generalized method without departing from the scope of the present invention. An exemplary more generalized method provides a method for selectively managing network resources. The method includes detecting a change in network topology and then automatically adjusting resource usage of one or more devices external to the network based on the change in network topology.

While certain embodiments of the present invention are discussed with reference to systems and methods controlling resource usage by a device based on the location of the device relative to the coverage area of a wireless AP, embodiments of the present invention are not limited thereto. For example, embodiments of the present invention may be adapted for use with wired networks wherein the physical location of the device in the network topology may affect which resources the device should be able to employ, without departing from the scope of the present invention.

Furthermore, many types of networks, either wired or wireless or combinations thereof, may benefit systems constructed according to embodiments of the present invention. Any acceptable architecture, topology, protocols, or other network and digital processing features can be employed. In general, soft switches, routers, access points, clients, and so on, can be implemented via any device with processing ability or other requisite functionality.

Although processes of the present invention and the hardware executing the processes may be characterized by language common to a discussion of the Internet (e.g., "client," "server," "peer"), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a client. For example, portable computing devices such as a Personal Digital Assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory. A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using one or more programmed general purpose digital computers; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system comprising:
   a first module coupled to a network device, wherein the first module is adapted to selectively provide position information associated with the network device, wherein the position information pertains to a location of the network device;
   a controller in communication with the first module, wherein the controller is adapted to:
      receive the position information;
      monitor a location of the network device relative to a geographic area;
      determine if the network device is outside the geographic area; and
      generate a control signal in response thereto if the network device is outside the geographic area; and
   a second module coupled to the network device, wherein the second module incorporates instructions to adjust one or more resources of the network device based on the control signal, and wherein one or more resources are selected from a group including router zeroization software for clearing router cache and network address translation (NAT) software.

2. The system of claim 1 further including a global positioning system (GPS) receiver included in the first module.

3. The system of claim 1, wherein the one or more resources comprises power resources.

4. The system of claim 1 further including one or more wireless network cards positioned to connect the network device to the controller when the network device is within the geographic area.

5. The system of claim 4 further including a wireless access point (AP) that is associated with a wide area network (WAN), and wherein the AP is coupled to the network device.

6. The system of claim 5 further including a mobile access router (MAR) included in the network device.

7. The system of claim 1, further comprising:
   a second module coupled to the network device, wherein the second module incorporates instructions to adjust one or more resources of the network device based on the control signal, and wherein the one or more resources comprise router zeroization software for clearing router cache.

8. The system of claim 1, further comprising:
   a second module coupled to the network device, wherein the second module incorporates instructions to adjust one or more resources of the network device based on the control signal, and wherein the one or more resources comprise network address translation (NAT) software.

9. A system comprising:
   first means for determining a first location associated with a network resource;
   second means for determining a coverage area of one or more access points associated with the network;
   third means for monitoring the first location associated with the network resource relative to the coverage area;
   fourth means for determining if the network resource is outside the coverage area;
   fifth means for generating a control signal if the network resource is outside the coverage area; and
   sixth means for employing the control signal to selectively adjust one or more resources associated with the network resource, based on the control signal, wherein the one or more resources comprise router zeroization software for clearing router cache and network address translation (NAT) software.

10. A method comprising:
    determining a first location associated with a network resource, wherein the determining is performed by a global positioning system (GPS) of a resource management system;
    determining a coverage area of one or more access points associated with the network;
    monitoring the first location of the network resource relative to the coverage area;
    determining if the network resource is outside the coverage area;
    generating a control signal if the network resource is outside the coverage area; and
    employing the control signal to selectively adjust one or more resources associated with the network resource, based on the control signal, wherein the one or more resources comprise router zeroization software for clearing router cache and network address translation (NAT) software.

11. The method of claim 10, wherein employing includes adjusting power consumption associated with the network resource.

12. The method of claim 10, wherein determining a coverage area includes determining a coverage area of a wireless network.

13. The method of claim 12, wherein the wireless network includes an 802.11 network.

14. The method of claim 12, wherein the wireless network resource includes a first wireless router.

15. The method of claim 14 further including defining the coverage area based on a coverage area of a second wireless router coupled to the network.

16. A system comprising:
    first means for detecting a change in network topology based on physical movement of one or more network devices in or out of a network coverage area of one or more access points, wherein the detecting comprises:
       monitoring a location of a network device relative to the network coverage area; and
       determining if the network device is outside the network coverage area;
    second means for generating a control signal if the network device is outside the coverage area; and
    third means for automatically adjusting one or more resources of the one or more network devices based on the control signal, wherein the one or more resources comprises router zeroization software for clearing router cache and network address translation (NAT) software.

17. The system of claim 16, wherein the one or more resources comprises power resources.

18. A method comprising:
   detecting a change in network topology based on physical movement of one or more network devices in or out of a network coverage area of one or more access points, wherein the detecting is performed by a global positioning system (GPS) of a resource management system, wherein the detecting comprises:
      monitoring a location of a network device relative to the network coverage area; and
      determining if the network device is outside the network coverage area;
   generating a control signal if the network device is outside the network coverage area; and
   automatically adjusting one or more resources of the one or more network devices based on the control signal, wherein the one or more resources comprise router zeroization software for clearing router cache and network address translation (NAT) software.

19. An apparatus comprising:
   one or more processors;
   a resource management system comprising a global positioning system (GPS) receiver module; and
   a machine-readable non-transitory medium including instructions executable by the one or more processors for;
      detecting a change in network topology based on physical movement of one or more network devices in or out of a network coverage area of one or more access points, wherein the detecting is performed by the GPS, wherein the detecting comprises:
         monitoring a location of a network device relative to the network coverage area; and
         determining if the network device is outside the network coverage area; and
         generating a control signal if the network device is outside the network coverage area; and
         automatically adjusting one or more resources of the one or more network devices based on the control signal, wherein the one or more resources comprise router zeroization software for clearing router cache and network address translation (NAT) software.

20. A machine-readable non-transitory medium including instructions executable by a processor comprising one or more instructions for:
   detecting a change in network topology based on physical movement of one or more network devices in or out of a network coverage area of one or more access points, wherein the detecting is performed by a global positioning system (GPS) of a resource management system, wherein the detecting comprises:
      monitoring a location of a network device relative to a network coverage area; and
      determining if the network device is outside the network coverage area;
   generating a control signal if the network device is outside the network coverage area; and
   automatically adjusting one or more resources of the one or more network devices based on the control signal, wherein the one or more resources comprises router zeroization software for clearing router cache and network address translation (NAT) software.

21. A system comprising:
   first means for determining a first location associated with a network resource in a network; and
   instructions that when executed on a processor cause the processor to perform operations that are operable to:
      determine a coverage area of one or more access points associated with the network;
      monitor the first location of the network resource relative to the coverage area;
      determine if the network resource is outside the coverage area;
      generate a control signal if the network resource is outside the coverage area; and
      employ the control signal to selectively adjust one or more resources associated with the network resource, based on the control signal, wherein the one or more resources comprise router zeroization software for clearing router cache and network address translation (NAT) software.

22. The system of claim 21, where a GPS-receiver system is used to determine the first location associated with the network resource.

23. The system of claim 21, where the determination if the network resource is outside the coverage area is made based on position information of the network resource received from a GPS-receiver system, network topology information maintained in a topology map module and knowledge of a range of a transceiver module of the network resource.

24. The system of claim 21, where selectively adjusting one or more resources associated with the network resource includes powering off a transceiver of the network resource, powering off hardware and software resources other than the transceiver and placing the network resource in a power-saving mode.

* * * * *

UNITED STATES PATENT AND TRADEMARK OFFICE
CERTIFICATE OF CORRECTION

| | | |
|---|---|---|
| PATENT NO. | : 8,014,833 B2 | |
| APPLICATION NO. | : 11/477295 | |
| DATED | : September 6, 2011 | |
| INVENTOR(S) | : Rao | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 922 days.

Signed and Sealed this
Fourteenth Day of February, 2012

David J. Kappos
*Director of the United States Patent and Trademark Office*